United States Patent
Yang et al.

(10) Patent No.: US 9,544,085 B2
(45) Date of Patent: Jan. 10, 2017

(54) METHOD AND APPARATUS FOR INTERFERENCE CANCELLATION

(71) Applicant: NOKIA SOLUTIONS AND NETWORKS OY, Espoo (FI)

(72) Inventors: Weidong Yang, Hoffman Estates, IL (US); Xiaoyi Wang, Wheeling, IL (US); Mihai Enescu, Espoo (FI); Eugene Visotsky, Buffalo Grove, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 85 days.

(21) Appl. No.: 14/541,788

(22) Filed: Nov. 14, 2014

(65) Prior Publication Data

US 2016/0142169 A1     May 19, 2016

(51) Int. Cl.
| | | |
|---|---|---|
| H04J 11/00 | (2006.01) | |
| H04B 7/02 | (2006.01) | |
| H04B 7/06 | (2006.01) | |

(52) U.S. Cl.
CPC ........... *H04J 11/0053* (2013.01); *H04B 7/024* (2013.01); *H04B 7/0626* (2013.01); *H04J 11/004* (2013.01); *H04J 11/0056* (2013.01)

(58) Field of Classification Search
None
See application file for complete search history.

(56) References Cited

U.S. PATENT DOCUMENTS

2015/0270917 A1* 9/2015 Roman .................. H04J 11/005
370/329

FOREIGN PATENT DOCUMENTS

| WO | WO 2014/133650 A1 | 9/2014 |
|---|---|---|
| WO | WO 2014/160984 A1 | 10/2014 |

OTHER PUBLICATIONS

Intel, R4-143034, "Discussion on NAICS interference semi-static parameters blind detection and signaling", 3GPP TSG-RAN WG4 Meeting #71, Seoul, Korea May 19-23, 2014.*
R4-142000; NVIDIA; "Discussion on higher-layer signaling for NAICS"; 3GPP TSG-RAN WG4 Meeting #70bis; San Jose Del Cabo, Mexico, Mar. 31-Apr. 4, 2014.
R4-143034; Intel Corporation; "Discussion on NAICS interference semi-static parameters blind detection and signaling"; 3GPP TSG-RAN WG4 Meeting #71; Seoul, Korea, May 19-23, 2014.
International Search Report application No. PCT/EP2015/074468 mailed Dec. 23, 2015.

(Continued)

*Primary Examiner* — Kwang B Yao
*Assistant Examiner* — Adam Duda
(74) *Attorney, Agent, or Firm* — Squire Patton Boggs (US) LLP

(57) ABSTRACT

Systems, methods, apparatuses, and computer program products for joint network assisted interference cancellation and suppression (NAICS) and coordinated multi-point (COMP) operation are provided. One method includes configuring, by a network node, a victim user equipment and interfering user equipment in transmission mode 10 (TM10) with multiple channel state information (CSI) processes to perform dynamic point muting. The method may further include signaling network assisted interference cancellation and suppression (NAICS) information to the victim user equipment pretending the interfering user equipment mode is transmission mode 9 (TM9) or transmission mode 8 (TM8).

15 Claims, 4 Drawing Sheets

(56) References Cited

OTHER PUBLICATIONS

3GPP TSG RAN WG1 Meeting #78 R1-142801 Dresden, Germany, Aug. 18-22, 2014; Final Report of 3GPP TSG RAN WG1 #77 v1.0.0; MCC Support.
3GPP TSG RAN WG1 Meeting #78bis R1-144335 Ljubljana, Slovenia, Oct. 6-10, 2014; Final Report of 3GPP TSG RAN WG1 #78 v1.1.0; MCC Support.
3GPP TSG RAN WG1 Meeting #78 R1-143299 Dresden, Germany, Aug. 18-22, 2014; Higher Layer Signaling of TM10 DMRS Properties for NAICS; Ericsson.
3GPP TSG RAN WG1 #78 Dresden, Germany, Aug. 18-22, 2014 R1-143516.

* cited by examiner

METHOD AND APPARATUS FOR INTERFERENCE CANCELLATION

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or 5G radio access technology. More specifically, some embodiments may relate to interference handling in communications networks.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13, etc.) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment is directed to a method. The method may include configuring, for example by a network node, a victim user equipment and interfering user equipment in transmission mode 10 with multiple channel state information processes to perform dynamic point muting. The method may then include causing signaling of network assisted interference cancellation and suppression information to the victim user equipment pretending the transmission mode of the interfering user equipment is transmission mode 9 or transmission mode 8. The network node may be an evolved node B (eNB).

In an embodiment, the method may further include transmitting on physical downlink shared channel to the interfering user equipment from a same serving point.

According to one embodiment, the signaling of the network assisted interference cancellation and suppression information causes the victim user equipment to cancel interference from the interfering user equipment. In certain embodiments, all channel state information processes of one user equipment share a common channel state information reference signal resource.

Another embodiment is directed to an apparatus that may include at least one processor and at least one memory including computer program code. The at least one memory and computer program code may be configured, with the at least one processor, to cause the apparatus at least to configure a victim user equipment and interfering user equipment in transmission mode 10 with multiple channel state information processes to perform dynamic point muting, and to signal network assisted interference cancellation and suppression information to the victim user equipment pretending the transmission mode of the interfering user equipment is transmission mode 9 or transmission mode 8.

In one embodiment, the at least one memory and computer program code may be further configured, with the at least one processor, to cause the apparatus at least to transmit on physical downlink shared channel to the interfering user equipment from a same serving point. According to an embodiment, the signaling of the network assisted interference cancellation and suppression information causes the victim user equipment to cancel interference from the interfering user equipment. In certain embodiments, all channel state information processes of one user equipment share a common channel state information reference signal resource.

Another embodiment is directed to an apparatus which may include means for configuring a victim user equipment and interfering user equipment in transmission mode 10 with multiple channel state information processes to perform dynamic point muting. The apparatus may also include means for causing signaling of network assisted interference cancellation and suppression information to the victim user equipment pretending the transmission mode of the interfering user equipment is transmission mode 9 or transmission mode 8.

Another embodiment is directed to a computer program, embodied on a non-transitory computer readable medium. The computer program may be configured to control a processor to perform a process. The process may include configuring, by a network node, a victim user equipment and interfering user equipment in transmission mode 10 with multiple channel state information processes to perform dynamic point muting. The process may also include causing signaling of network assisted interference cancellation and suppression information to the victim user equipment pretending the transmission mode of the interfering user equipment is transmission mode 9 or transmission mode 8.

Another embodiment is directed to a method, which may include receiving by a victim UE, from a network (e.g., eNB), network assisted interference cancellation and suppression (NAICS) information pretending a transmission mode of an interfering user equipment is transmission mode 9 or transmission mode 8. The method may further include canceling interference from the interfering user equipment using the received NAICS information.

Another embodiment is an apparatus that may include at least one processor and at least one memory including computer program code. The at least one memory and computer program code may be configured, with the at least one processor, to cause the apparatus at least to receive, from a network (e.g., eNB), network assisted interference cancellation and suppression (NAICS) information pretending a transmission mode of an interfering user equipment is transmission mode 9 or transmission mode 8, and to cancel interference from the interfering user equipment using the received NAICS information.

Another embodiment is directed to an apparatus that may include means for receiving, from a network (e.g., eNB), network assisted interference cancellation and suppression (NAICS) information pretending a transmission mode of an interfering user equipment is transmission mode 9 or transmission mode 8. The apparatus may further include means for canceling interference from the interfering user equipment using the received NAICS information.

Another embodiment is directed to a computer program, embodied on a non-transitory computer readable medium. The computer program may be configured to control a processor to perform a process. The process may include receiving, from a network (e.g., eNB), network assisted interference cancellation and suppression (NAICS) information pretending a transmission mode of an interfering user equipment is transmission mode 9 or transmission mode 8. The method may further include canceling interference from the interfering user equipment using the received NAICS information.

BRIEF DESCRIPTION OF THE DRAWINGS

For proper understanding of the invention, reference should be made to the accompanying drawings, wherein.

DETAILED DESCRIPTION

Figure 1:
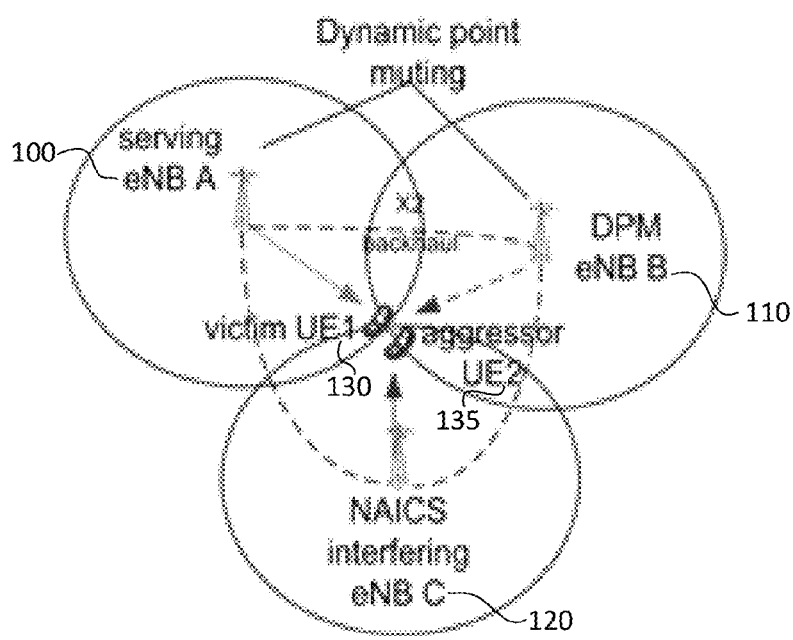
FIG. 1 illustrates an example system depicting CoMP and NAICS operation, according to an embodiment.

It will be readily understood that the components of the invention, as generally described and illustrated in the figures herein, may be arranged and designed in a wide variety of different configurations. Thus, the following detailed description of some embodiments of systems, methods, apparatuses, and computer program products for joint network assisted interference cancellation and suppression (NAICS) and coordinated multi-point (COMP) operation, for example in 3GPP Release-12, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention generally relate to the area of interference handling. Interference handling in Rel-12 includes CoMP, enhanced CoMP (eCoMP), inter-cell interference coordination (ICIC), evolved ICIC (eICIC), and NAICS. The cancellation of interfering transmissions on transmission modes (TMs) 1, 2, 3, 4, 6, 8, 9 is supported in Rel-12 through NAICS signaling.

Since Rel-11, interference mitigation through CoMP has been available. The current CoMP/eCoMP operation is based on transmission mode 10 (TM10). On the other hand, the Rel-12 NAICS interference cancellation of a TM10 interferer is not supported. Through extensive simulation studies, it has been found that the joint use of NAICS and CoMP can provide, for example, substantial performance in terms of sector and cell-edge throughput. Hence, if signaling allows, one embodiment of the invention provides a way for joint CoMP and NAICS operation.

As mentioned above, the separate operations of CoMP and NAICS are supported in Rel-12. Examples of CoMP schemes include dynamic point muting (DPM), joint transmission (JT), and dynamic point selection (DPS), etc. However, previously there was no support for the joint operation of CoMP and NAICS.

Depending on a UEs' release number, and network configuration, embodiments can provide many variations for the joint NAICS and CoMP operation. Some exemplary scenarios are discussed below, with some simplified assumptions for illustrative purposes.

To obtain joint NAICS and CoMP gains, a Rel-12 network may be comprised of eNBs supporting the NAICS signaling. According to some embodiments, it may be assumed that UEs are NAICS capable UEs (Rel-12 NAICS) and CoMP capable (e.g., TM10 with multiple CSI processes). In certain embodiments, it may be further assumed that dynamic point muting (DPM) is the applied CoMP scheme.

In some embodiments, all the UEs are assumed to be configured with TM 10. In order to perform dynamic point muting, multiple channel state information (CSI) processes are configured, each with a different interference measurement resource (IMR) corresponding to different interference/muting hypothesis. Yet a common channel state information reference signal (CSI-RS) resource is configured for all CSI processes and thus the desired signal is always from the same serving point. Compared to Rel-10 with Rel-11 CoMP, the difference between a TM9 and TM10 is the multiple CSI processes for feedback. The physical downlink shared channel (PDSCH) demodulation may be the same. With the above operation, CoMP DPM gains can be achieved.

According to some embodiments, NAICS may be operated based on TM10 UEs even if TM10 as such is not part of the interference cancelation. From the PDSCH structure of the interferer, the main difference between TM9 and TM10 is the fact that TM10 may operate in single cell ID scenarios where multiple points share the same physical cell ID. This means that the TM10 relies in that scenario on quasi-collocation (QCL) and virtual cell Id (vSCID) signaling. However, TM10 is also possible to be operated in non-single cell ID cases and hence the QCL and vSCID are not needed.

Moreover, if a cell is operating DPM, as the signal is transmitted from the same cell, there is no need for QCL signaling as such. This means that even though the whole network (cell 1, cell 2, cell 3, . . . ) operates on TM10, this is more from the perspective of multiple process operation rather than from QCL/nSCID signaling. Thus, for a TM10 UE, the network can configure NAICS signaling pretending interference cells operating in TM9 which is facilitated by the TM subset information in the NAICS signaling. For example, a network node (e.g., eNB) may signal to NAICS UE that dominant downlink interfering signal (e.g., on PDSCH) is in TM9, although actually the interfering signal is TM10. A prerequisite for this operation is that the NAICS UE is operating in TM10. With this, NAICS can be achieved.

FIG. 1 illustrates one example of CoMP and NAICS operation, according to an embodiment. In the example system of FIG. 1, three access nodes are depicted as eNB A 100, eNB B 110, and eNB C 120. Also, the example of FIG. 1 illustrates two mobile devices as UE1 130 and UE2 135. It should be noted that embodiments of the invention are not limited to this configuration or number of nodes, and any number of access nodes and mobile devices may be incorporated.

As illustrated in the example of FIG. 1, the DPM serving point is eNB A, while the two points involved in DPM are eNB A and eNB B. In this example, the dominant interference that the victim UE1 is experiencing is coming from eNB B and/or eNB C. More specifically, the interference that UE1 experiences may be a result of the transmission from eNB B and/or eNB C toward UE2. In this example, eNB B may be considered to be the dominant interferer. When eNB B is muted, the first dominant interferer may become eNB C.

In view of the above, according to an embodiment, the network (e.g., eNB) may enable dynamic point muting in a network operating on TM10 using NAICS signaling designed for TM9 or TM8. The network may then configure NAICS signaling to NAICS UE pretending interference UE modes as TM9 or TM8, although the interfering UE is configured in TM10 with multiple CSI processes. According to certain embodiments, standard related support may include: 1. test case definitions in RAN4, specifically NAICS TM10 UE with interference cancellation capability for TMs 1, 2, 3, 4, 6, 8 and/or 9; 2. radio resource control (RRC) signaling design for NAICS should be irrelevant to the receive or victim UE's transmission mode (e.g., TM 10 UE can recognize NAICS signaling).

In an embodiment, the network configures the victim UE and the interference UE in TM10 with multiple CSI processes to perform dynamic muting. All CSI processes of one UE may share a common CSI-RS resource. The network may then signal NAICS information to victim NAICS UE pretending interfering UE is in a demodulation reference signal (DMRS) based mode, such as TM9 or TM8. Upon receiving the NAICS signaling, the TM10 UE may cancel the interference from TM9 or TM 8 UE. In an embodiment, the network node (e.g., eNB) then transmits (e.g., on PDSCH) to interference UE from the same serving point.

Table 1 shows an example of the results of one simulation study. From these simulation results, the benefits of joint NAICS and CoMP operation can clearly be seen. In particular, the cell edge gain and sector throughput (TH) gain both increase with the joint operation.

TABLE 1

| Setup | Avg TH (Mbps) | Cell edge TH (Kbps) | Utilization Ratio |
|---|---|---|---|
| IRC | 17.34 | 3617.19 | 0.387 |
| NAICS | 18.25 (5.3%) | 3895.79 (7.7%) | 0.37 |
| IRC, CoMP dynamic muting | 19.03 (9.7%) | 3975.81 (9.9%) | 0.318 |
| NAICS, CoMP dynamic muting | 20.06 (15.7%) | 4298.49 (18.8%) | 0.305 |

The results in Table 1 involve a coordination area of 9 cells. In the area, there are a number of active UEs that are reporting CSI per muting hypothesis. For instance, each UE could report CQI under i) the hypothesis with no cell muted, ii) hypothesis with the dominant cell muted, iii) hypothesis with second dominant cell muted. Given all the CQI reports, the scheduler evaluates all possible hypothesis and picks the one that maximizes some metric. Supposing one of 9 cells is muted, there are still 8 UEs that are scheduled in the non-muted cells. Since each UE has a different dominant interferer, there is no reason that the cell that was muted is the dominant interferer for all scheduled UEs. Hence, even with DPM, there is a significant number of UEs that have active dominant interferers and that could still benefit from applying NAICS receivers. Hence joint NAICS and DPM provide gains over just NAICS or DPM.

As the NAICS receivers from Rel-12 include symbol level interference canceller (SLIC) and reduced complexity maximum likelihood (R-ML), or enhanced interference rejection combining (IRC), there can be issues if the resource elements (REs) assumed to be taken by interfering PDSCH transmissions are actually for interference measurement resources (IMRs). However, due to the small number of REs taken by IMRs, the performance degradation is small. Furthermore, it should be noted that the IMRs from an adjacent cell can be covered by the zero power CSI-RS in the serving cell, so the problem can be minimized or avoided, at a small cost of not transmitting on a few REs at sparse occasions.

Although Rel-12 NACIS doesn't support TM10, some embodiments utilize implementation based approach to support NAICS together with DPM. As a result, the performance gain of NAICS and CoMP can be combined.

Figure 2:
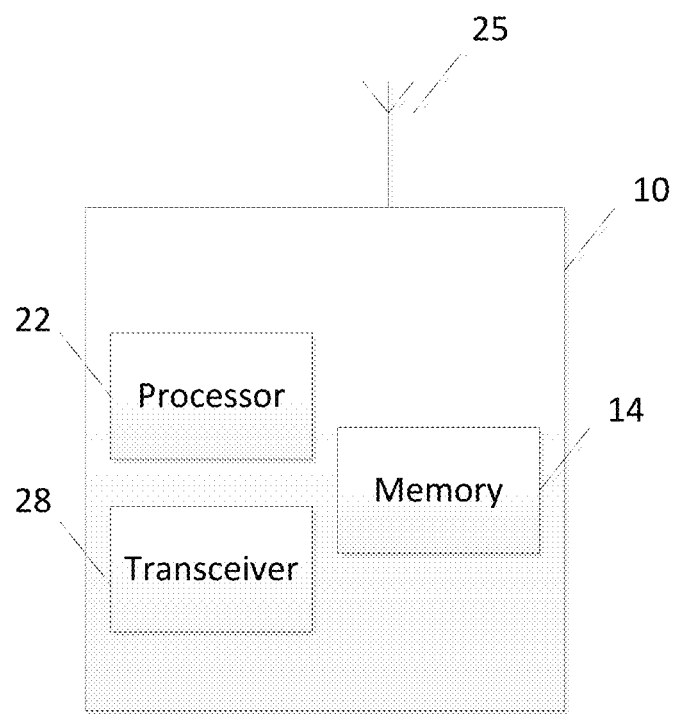
FIG. 2 illustrates a block diagram of an apparatus, according to one embodiment.

FIG. 2 illustrates an example of an apparatus 10 according to an embodiment. In an embodiment, apparatus 10 may be a node, host, or server in a communications network or serving such a network, such as a base station in a communications network or eNB in LTE. It should be noted that one of ordinary skill in the art would understand that apparatus 10 may include components or features not shown in FIG. 2.

As illustrated in FIG. 2, apparatus 10 may include a processor 22 for processing information and executing instructions or operations. Processor 22 may be any type of general or specific purpose processor. While a single processor 22 is shown in FIG. 2, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be an access node, such as a base station or eNB. In this embodiment, apparatus 10 may be controlled by memory 14 and processor 22 to configure a victim UE (i.e., a UE experiencing interference) and interfering UE in transmission mode 10 (TM10) with multiple channel state information (CSI) processes to perform dynamic point muting (DPM). In an embodiment, apparatus 10 may be further controlled by memory 14 and processor 22 to signal network assisted interference cancellation and suppression (NAICS) information to the victim UE pretending the mode of the interfering UE is transmission mode 9 (TM9) or transmission mode 8 (TM8).

According to an embodiment, apparatus 10 may be controlled by memory 14 and processor 22 to transmit physical downlink shared channel (PDSCH) to the interfering user equipment from a same serving point. In one embodiment, the signaling of the NAICS information causes the victim user equipment to cancel interference from the interfering user equipment. According to one example, all channel state information (CSI) processes of one user equipment share a common channel state information reference signal (CSI-RS) resource.

In another embodiment, apparatus 10 may be a mobile device or user equipment (UE) or a modem, for example. In this embodiment, apparatus 10 may be configured, by a network node (e.g. eNB), to perform dynamic point muting. Apparatus 10 may be controlled by memory 14 and processor 22 to receive, from the network, network assisted interference cancellation and suppression (NAICS) information pretending a transmission mode of the interfering user equipment is transmission mode 9 or transmission mode 8. In an embodiment, apparatus 10 may be controlled by memory 14 and processor 22 to cancel interference from the interfering user equipment using the received NAICS information.

Figure 3:
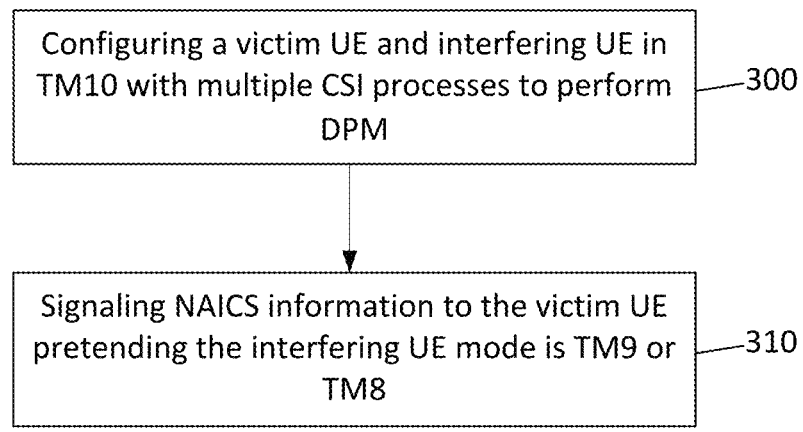
FIG. 3 illustrates a flow diagram of a method, according to an embodiment.

FIG. 3 illustrates an example flow diagram of a method, according to one embodiment. In an embodiment, the method illustrated in FIG. 3 may be performed by a network node, such as an eNB. As illustrated in FIG. 3, the method may include, at 300, configuring a victim UE (e.g., interfered UE) and interfering UE in transmission mode 10 (TM10) with multiple channel state information (CSI) processes to perform dynamic point muting (DPM). The method may also include, at 310, causing signaling NAICS information to the victim UE pretending the interfering user equipment mode (the transmission mode of the interfering user equipment) is transmission mode 9 (TM9) or transmission mode 8 (TM8).

In an embodiment, the method may further include transmitting on PDSCH to the interfering UE from a same serving point. According to an example embodiment, the signaling of the NAICS information causes the victim UE to cancel interference from the interfering UE.

Figure 4:
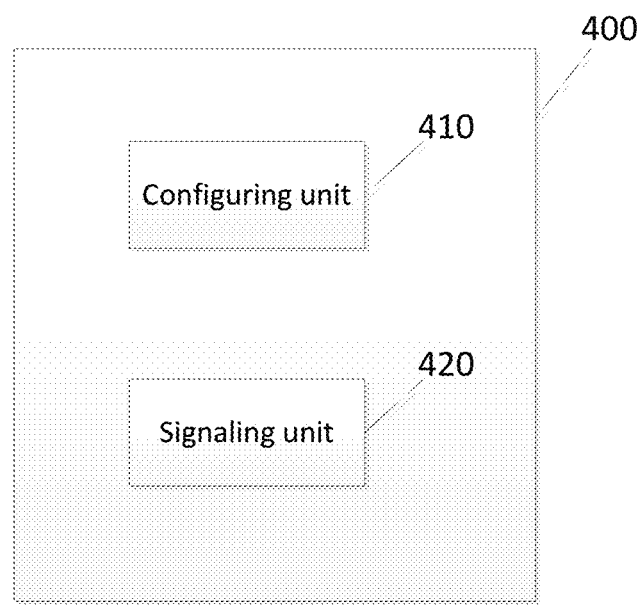
FIG. 4 illustrates a block diagram of an apparatus, according to another embodiment.

FIG. 4 illustrates a block diagram of an apparatus 400, according to another embodiment. In this embodiment, apparatus 400 may include a configuring unit (or means) 410 for configuring a victim UE and interfering UE in TM10 with multiple CSI processes to perform DPM. Apparatus 400 may further include a signaling unit (or means) 420 for signaling NAICS information to the victim UE pretending the interfering UE is in TM9 or TM8. This causes the victim UE to be able to cancel the interference from the interfering UE.

Figure 5:
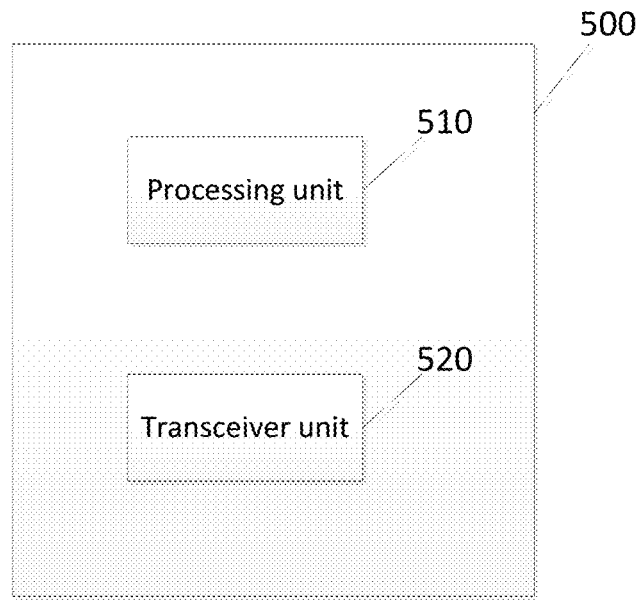
FIG. 5 illustrates a block diagram of an apparatus, according to another embodiment.

FIG. 5 illustrates an example of an apparatus 500, according to another embodiment. In one embodiment, apparatus 500 may be a mobile device or user equipment (UE) or a modem, for example. Apparatus 500 may be configured, by a network node (e.g. eNB), to perform dynamic point muting. In the example of FIG. 5, apparatus 500 may include a processing unit (or means) 510 and transceiver unit (or means) 520. According to an embodiment, transceiver unit 520 may be configured to receive, from the network, network assisted interference cancellation and suppression (NAICS) information pretending an interfering user equipment mode is transmission mode 9 or transmission mode 8. In an embodiment, processing unit 510 may be configured to cause apparatus 500 to cancel interference from the interfering user equipment using the received NAICS information.

Figure 6:
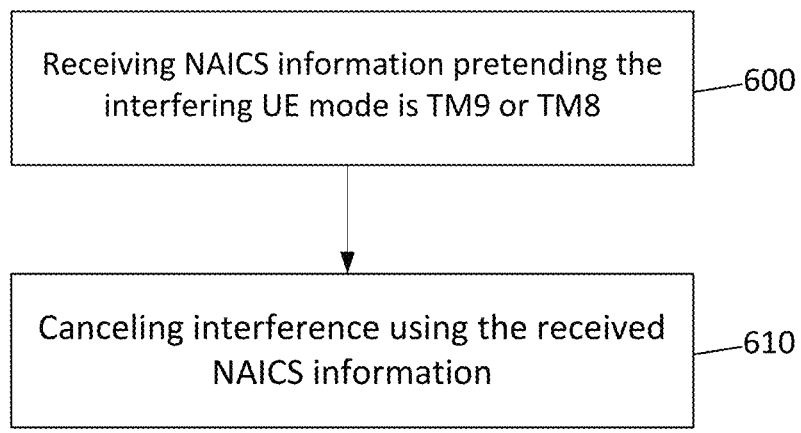
FIG. 6 illustrates a flow diagram of a method, according to another embodiment.

FIG. 6 illustrates an example flow diagram of a method, according to another embodiment. In an embodiment, the method illustrated in FIG. 6 may be performed by a mobile device, such as UE, or may be performed by a processor or controller of the UE. As illustrated in FIG. 6, the method may include, at 600, receiving, from a network (e.g., eNB), network assisted interference cancellation and suppression (NAICS) information pretending an interfering user equipment mode (the transmission mode of the interfering user equipment) is transmission mode 9 or transmission mode 8. In an embodiment, the method may further include, at 610, canceling interference from the interfering user equipment using the received NAICS information.

In some embodiments, the functionality of any of the methods described herein, such as those illustrated in FIG. 3 or FIG. 6 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
configuring, by a network node, a victim user equipment and interfering user equipment in transmission mode 10 with multiple channel state information processes to perform dynamic point muting; and
signaling network assisted interference cancellation and suppression information to the victim user equipment pretending that the transmission mode of the interfering user equipment is transmission mode 9 or transmission mode 8.

2. The method according to claim 1, further comprising transmitting on physical downlink shared channel to the interfering user equipment from a same serving point.

3. The method according to claim 1, wherein the signaling of the network assisted interference cancellation and suppression information causes the victim user equipment to cancel interference from the interfering user equipment.

4. The method according to claim 1, wherein all channel state information processes of one user equipment share a common channel state information reference signal resource.

5. The method according to claim 1, wherein the network node comprises an evolved node B.

6. An apparatus, comprising:
at least one processor; and
at least one memory including computer program code,
the at least one memory and computer program code configured, with the at least one processor, to cause the apparatus at least to
configure a victim user equipment and interfering user equipment in transmission mode 10 with multiple channel state information processes to perform dynamic point muting; and
signal network assisted interference cancellation and suppression information to the victim user equipment pretending that the transmission mode of the interfering user equipment is transmission mode 9 or transmission mode 8.

7. The apparatus according to claim 6, wherein the at least one memory and computer program code are further configured, with the at least one processor, to cause the apparatus at least to transmit on physical downlink shared channel to the interfering user equipment from a same serving point.

8. The apparatus according to claim 6, wherein the signaling of the network assisted interference cancellation and suppression information causes the victim user equipment to cancel interference from the interfering user equipment.

9. The apparatus according to claim 6, wherein all channel state information processes of one user equipment share a common channel state information reference signal resource.

10. The apparatus according to claim 6, wherein the apparatus comprises an evolved node B.

11. A computer program, embodied on a non-transitory computer readable medium, the computer program configured to control a processor to perform a process, comprising:
configuring, by a network node, a victim user equipment and interfering user equipment in transmission mode 10 with multiple channel state information processes to perform dynamic point muting; and
signaling network assisted interference cancellation and suppression information to the victim user equipment pretending that the transmission mode of the interfering user equipment is transmission mode 9 or transmission mode 8.

12. The computer program according to claim 11, further comprising transmitting on physical downlink shared channel to the interfering user equipment from a same serving point.

13. The computer program according to claim 11, wherein the signaling of the network assisted interference cancellation and suppression information causes the victim user equipment to cancel interference from the interfering user equipment.

14. The computer program according to claim 11, wherein all channel state information processes of one user equipment share a common channel state information reference signal resource.

15. The computer program according to claim 11, wherein the network node comprises an evolved node B.

* * * * *